US007282552B1

(12) United States Patent
Sosa et al.

(10) Patent No.: US 7,282,552 B1
(45) Date of Patent: Oct. 16, 2007

(54) STYRENE COPOLYMERS WITH A BIMODAL MOLECULAR WEIGHT DISTRIBUTION

(75) Inventors: Jose M. Sosa, Deer Park, TX (US); Shazia Ullah, Houston, TX (US); Billy Ellis, Spring, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 11/383,675

(22) Filed: May 16, 2006

(51) Int. Cl.
*C08F 220/12* (2006.01)
*C08F 212/08* (2006.01)

(52) U.S. Cl. .................................. 526/329.2; 526/347

(58) Field of Classification Search ............ 526/329.2, 526/347
See application file for complete search history.

(56) References Cited

U.S. PATENT DOCUMENTS

| | | | |
|---|---|---|---|
| 4,073,738 A | | 2/1978 | Ladenberger et al. |
| 4,486,524 A | * | 12/1984 | Fujisaki et al. .......... 430/109.3 |
| 4,663,357 A | | 5/1987 | Meyer et al. |
| 4,673,694 A | | 6/1987 | Meyer et al. |
| 4,777,210 A | | 10/1988 | Sosa et al. |
| 5,650,106 A | | 7/1997 | Paquet et al. |
| 6,258,504 B1 | * | 7/2001 | Bartus et al. .......... 430/137.17 |
| 6,326,449 B1 | * | 12/2001 | Haldankar ................. 526/310 |
| 6,350,842 B1 | * | 2/2002 | Wang ...................... 526/329.6 |
| 6,495,648 B1 | * | 12/2002 | Inagaki et al. .............. 526/347 |
| 6,569,941 B2 | | 5/2003 | Sosa et al. |
| 6,583,252 B2 | * | 6/2003 | Schuler et al. .............. 526/319 |
| 6,706,814 B2 | | 3/2004 | Demirors |
| 6,803,166 B2 | * | 10/2004 | Cheng et al. .......... 430/137.14 |
| 2005/0070662 A1 | | 3/2005 | Sosa et al. |
| 2005/0148749 A1 | | 7/2005 | Scherer et al. |
| 2005/0239937 A1 | | 10/2005 | Scherer et al. |

OTHER PUBLICATIONS

Davis, Thomas P., et al., "Copolymerization Propagation Kinetics of Styrene with Alkyl Methacrylates," Macromolecules, vol. 23, No. 8, American Chemical Soceity, 1990, pp. 2113-2119.
Simon, George P., et al. "Free Volume and Molecular In a Styrene/N-Butyl Methacrylate Copolymer Series," ANTEC Paper, Florida, May 2000, 5 pgs.
Stergiou, G., et al, "Radical copolymerization of styrene and alkyl methacrylates: monomer reactivity ratios and thermal properties," European Polymer Journal, vol. 38, Elsevier Science, 2002, pp. 1963-1970.
Weidisch, R., et al., "Transition from Crazing to Shear Deformation in Star Block Copolymers," Macromolecules, vol. 35, No. 17, American Chemical Society, 2002, pp. 6585-6591.

* cited by examiner

*Primary Examiner*—Fred Teskin
(74) *Attorney, Agent, or Firm*—Tenley R. Krueger

(57) ABSTRACT

A styrene copolymer composition comprising at least one alkyl acrylate and/or at least one alkyl methacrylate wherein the styrene copolymer composition has a bimodal molecular weight distribution. A method of producing a styrene copolymer comprising reacting styrene and at least one alkyl acrylate and/or at least one alkyl methacrylate, wherein the alkyl acrylate comprises an alkyl group having from 8 to 12 carbon atoms and the alkyl methacrylate comprises an alkyl group having equal to or greater than 10 carbon atoms. A method of increasing the molecular weight distribution in a styrene copolymer comprising incorporating at least one alkyl acrylate and/or at least one alkyl methacrylate wherein the styrene copolymer has a polydispersity index equal to or greater than 3.

16 Claims, 6 Drawing Sheets

FIG. 3
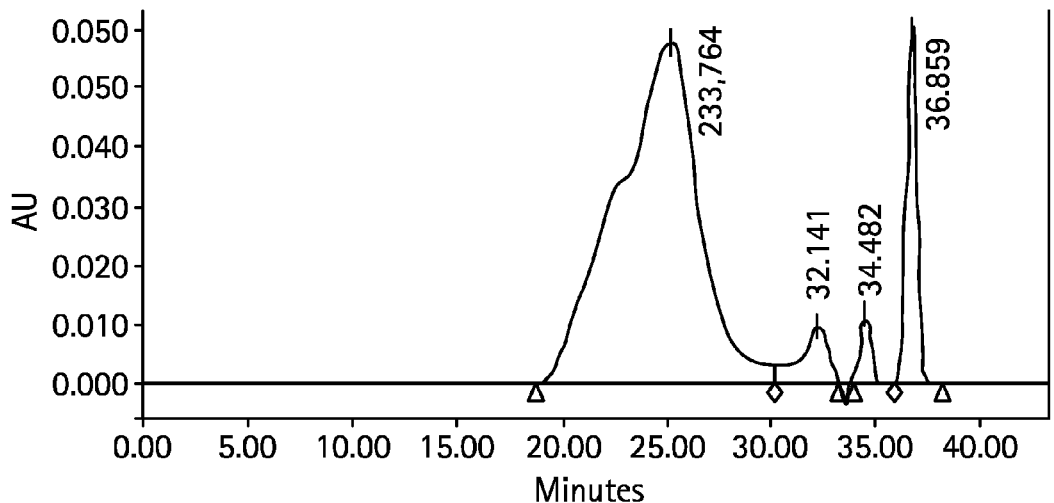
GPC Results
| | Mn | Mw | Mz | MP | Polydispersity | Mz+1 |
|---|---|---|---|---|---|---|
| 1 | 136,673 | 1,080,070 | 4,232,026 | 233,764 | 7.58 | 8,025,070 |
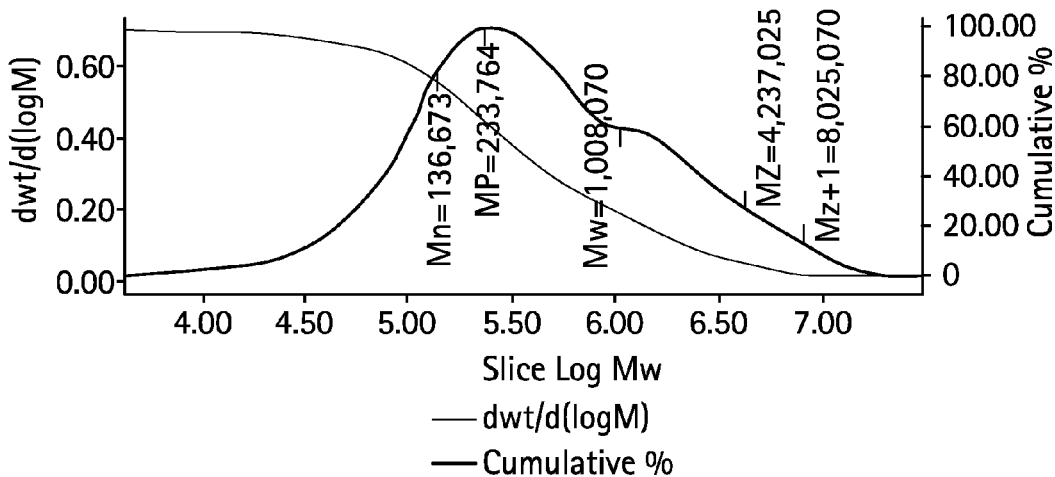

FIG. 4
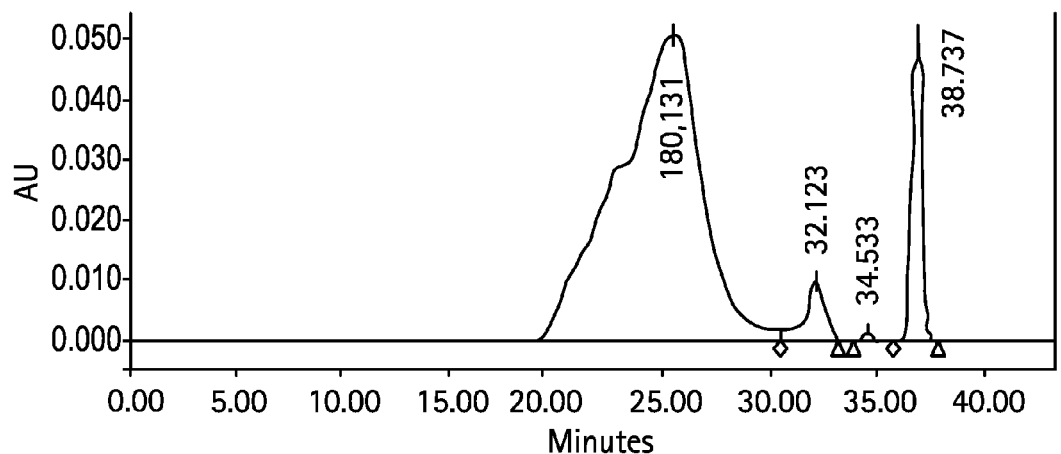
GPC Results
| | Mn | Mw | Mz | MP | Polydispersity | Mz+1 |
|---|---|---|---|---|---|---|
| 1 | 121,284 | 1,019,222 | 4,624,316 | 195.131 | 8.40 | 8,523,279 |
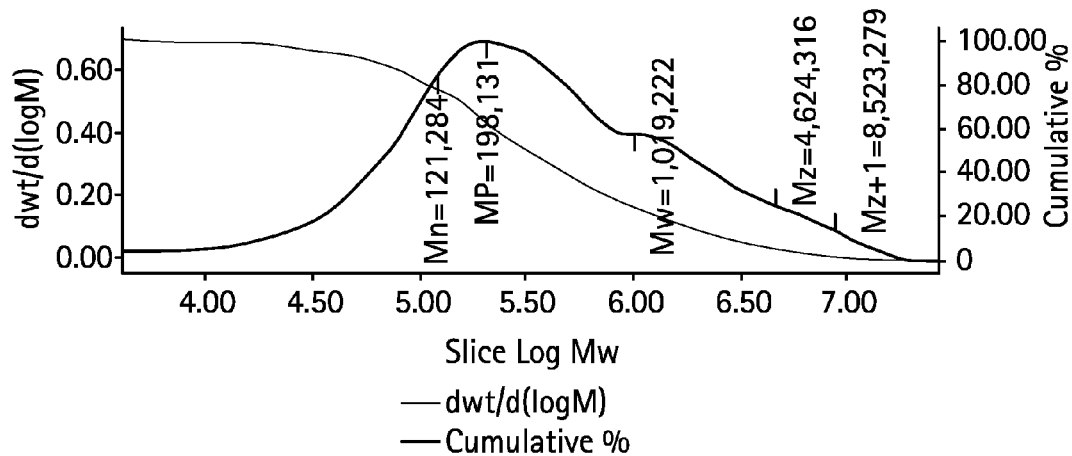
— dwt/d(logM)
— Cumulative %

Plot of Polydispersity Index vs % Comonomer in the Feed

STYRENE COPOLYMERS WITH A BIMODAL MOLECULAR WEIGHT DISTRIBUTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present disclosure relates generally to the production of polystyrene and more specifically to the production of polystyrene having a broad molecular weight distribution.

2. Background of the Invention

Copolymers of monovinylidene aromatic compounds such as styrene, alpha-methylstyrene and ring-substituted styrene comprise some of the most widely used thermoplastic elastomers. For example, styrene copolymers can be useful for a range of applications including disposable medical products, food packaging, tubing and, point-of-purchase displays. Styrenic copolymers are block copolymers that comprise polystyrenic segments interconnected with a matrix comprising compounds such as polybutadiene or polyisoprene. The polystyrenic segments give hardness or rigidity to the copolymer while the interconnecting matrix provides softness or flexibility.

The molecular weight of a thermoplastic elastomer will generally dictate the resultant physical properties of the thermoplastic. As a rule, the higher the molecular weight, the higher mechanical properties (e.g., tensile, flexural, compressive strength) will be. However, processing of very high molecular weight thermoplastics is quite difficult. For example, the molecular weight ($M_w$) of commercial polystyrene is typically in the range of 200-350 kDa. This limits the physical properties but ensures good processibility. However, polymers having fractions of high and low molecular weight components would provide materials having both the desired strength (due to the high molecular weight components) and processability (due to the low molecular weight components). Thus a need exists for a styrenic copolymer having a good balance between strength and processability.

BRIEF SUMMARY OF THE INVENTION

Disclosed herein is a styrene copolymer composition comprising at least one alkyl acrylate and/or at least one alkyl methacrylate wherein the styrene copolymer composition has a bimodal molecular weight distribution.

Further disclosed herein is a method of producing a styrene copolymer comprising reacting styrene and at least one alkyl acrylate and/or at least one alkyl methacrylate, wherein the alkyl acrylate comprises an alkyl group having from 8 to 12 carbon atoms and the alkyl methacrylate comprises an alkyl group having equal to or greater than 10 carbon atoms.

Also disclosed herein is a method of increasing the molecular weight distribution in a styrene copolymer comprising incorporating at least one alkyl acrylate and/or at least one alkyl methacrylate wherein the styrene copolymer has a polydispersity index equal to or greater than 3.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the invention, reference will now be made to the accompanying drawings in which:

FIGS. 3-4 are plots of the molecular weight distribution of the polymeric composition.

DETAILED DESCRIPTION OF THE INVENTION

Figure 1:
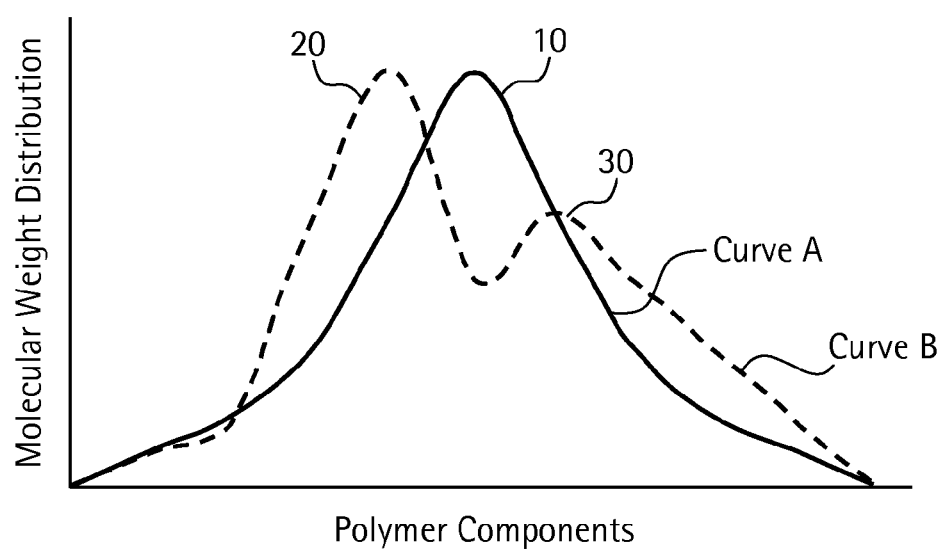
FIG. 1 is a representative graph of molecular weight distribution.

Disclosed herein are styrenic copolymer compositions (SCP) and methods of preparing same. In an embodiment, the SCP comprises a copolymer of styrene and an alkyl acrylate. In other embodiments, the SCP comprises a copolymer of styrene and an alkyl methacrylate. In an embodiment, the SCP comprises a copolymer of styrene, an alkyl acrylate and an alkyl methacrylate. The addition of an alkyl acrylate and/or an alkyl methacrylate may result in SCPs displaying a bimodal molecular weight distribution. Such SCPs may possess advantageous mechanical and/or optical properties such as reduced haze and an increased die swell.

In an embodiment the SCP comprises a copolymer of styrene. Styrene, also known as vinyl benzene, ethyenylbenzene and phenylethene is an organic compound represented by the chemical formula $C_8H_8$. Styrene is widely commercially available and as used herein the term styrene includes a variety of substituted styrenes (e.g., alpha-methyl styrene), ring-substituted styrenes such as p-methylstyrene as well as unsubstituted styrenes.

In an embodiment, the SCP comprises a comonomer wherein the comonomer is an alkyl acrylate having the general chemical formula $CH_2=CHCOOR$ wherein R represents an alkyl group having equal to or greater than 8 carbon atoms, alternatively from 8-12 carbon atoms, alternatively from 8-10 carbon atoms. Herein an alkyl group refers to a saturated hydrocarbon occurring as a side chain on a larger molecule. In an embodiment, the SCP comprises a comonomer wherein the comonomer is an alkyl methacrylate having the general chemical formula $CH_2=C(CH_3)COOR$ wherein R represents an alkyl group having equal to or greater than 10 carbon atoms. Examples of suitable alkyl acrylates include without limitation octyl acrylate, nonyl acrylate, decyl acrylate, undecyl acrylate, docdecyl acrylate, or combinations thereof. Examples of suitable alkyl methacrylates include isodcecyl methacrylate, undecyl methacrylate, stearyl methacrylate or combinations thereof. In an embodiment, the SCP comprises as comonomer a mixture of octyl and decyl acrylates (O/DA) an example of which includes without limitation SR-484 O/DA mixture commercially available from Sartomer. Such mixtures of octyl and decyl acrylate (e.g. SR-484) may generally have the physical properties given in Table 1.

TABLE 1

| PROPERTY | VALUE |
|---|---|
| Appearance | Clear Liquid |
| Functionality | 1 |
| Color, APHA | 40 |
| Specific Gravity @ 25° C. | 0.8795 |
| Viscosity, cps @ 25° C. | 4 |
| Refractive Index @ 25° C. | 1.4371 |
| Molecular Weight | 203 |

In an embodiment, the SCP comprises as comonomer isodecyl methacrylate (IDMA), an example of which includes without limitation SR-242 isodecyl methacrylate commercially available from Sartomer. The IDMA (e.g. SR-242) may generally have the physical properties given in Table 2.

TABLE 2

| PROPERTY | VALUE |
|---|---|
| Functionality | 1 |
| Appearence | Clear Liquid |
| Inhibitor, ppm | 80 HQ, 60 MEHQ |
| Solvent, wt % | 0.1 |
| Water, wt % | 0.2 |
| Acid, wt % | 0.05 |
| Color, APHA (G-Gardner Scale) | 40 |
| Specific Gravity @ 25° C. | 0.878 |
| Viscosity, cps | 5 @ 25° C. |
| Refractive Index | 1.4414 |
| Surface tension, dynes/cm | 29.4 |
| Molecular Weight | 226 |

In an embodiment, the SCP comprises more than one comonomer. For example, the SCP may comprise more than one alkyl acrylate and/or more than one alkyl methacrylate. Alternatively, the SCP may comprise at least one alkyl acrylate and at least one alkyl methacrylate. In either embodiment, the alkyl acrylate and alkyl methacrylate are of the types disclosed herein. Such polymeric compositions may also display the enhanced mechanical and optical properties to be described in detail later herein.

In an embodiment, the comonomer (i.e. alkyl acrylate and/or alkyl methacrylate) of this disclosure is present in the reaction mixture in an amount of 20% by weight of the polymer, alternatively from 0.1% to 25%, and alternatively from 1% to 12% based on total wt of compositions (i.e styrene+comonomer+additives).

In an embodiment, the SCP may also contain additives as deemed necessary to impart desired physical properties, such as, increased gloss or color. Examples of additives include without limitation chain transfer agents, talc, antioxidants, UV stabilizers, lubricants, mineral oil, plasticizers and the like. The aforementioned additives may be used either singularly or in combination to form various formulations of the SCP. For example, stabilizers or stabilization agents may be employed to help protect the SCP from degradation due to exposure to excessive temperatures and/or ultraviolet light. These additives may be included in amounts effective to impart the desired properties. Effective additive amounts and processes for inclusion of these additives to polymeric compositions are known to one skilled in the art.

In an embodiment, a method for the production of an SCP comprises the dissolution of a comonomer such as an alkyl acrylate and/or alkyl methacrylate in styrene that is subsequently polymerized. The polymerization of the SCP can be done using any method known to be useful to those of ordinary skill in the art for preparing a styrene copolymer.

In an embodiment, the SCP polymerization reaction contains at least one initiator. Such initiators may function as the source of free radicals to enable the polymerization of styrene. In an embodiment, any initiator capable of free radical formation that facilitates the polymerization of styrene may be employed. Such initiators are well known in the art and include by way of example and without limitation organic peroxides. Examples of organic peroxides useful for polymerization initiation include without limitation diacyl peroxides, peroxydicarbonates, monoperoxycarbonates, peroxyketals, peroxyesters, dialkyl peroxides, hydroperoxides or combinations thereof. The selection of initiator and effective amount will depend on numerous factors (e.g. temperature, reaction time) and can be chosen by one skilled in the art to meet the desired needs of the process.

In an embodiment, a reaction mixture for the production of an SCP may comprise from about 75% to about 99% styrene, from about 1% to about 20% alkyl acrylate and/or alkyl methacrylate, from about 0.001% to about 0.2% initiator and additional components as needed to impart the desired physical properties. The percent values given are percentages by weight of the total composition.

Said polymerization reactions may be carried out using a continuous production process in a polymerization apparatus comprising a single reactor or a plurality of reactors. For example, the SCP can be prepared using an upflow reactor. The polymerization process can be either continuous or done in batches. The temperature ranges useful with the process of the present disclosure can be selected to be consistent with the operational characteristics of the equipment used to perform the polymerization. In one embodiment, the temperature range for the polymerization can be from 100° C. to 230° C. In another embodiment, the temperature range for the polymerization can be from about 110° C. to 180° C. In yet another embodiment, the SCP polymerization reaction may be carried out in a plurality of reactors with each reactor having an optimum temperature range. For example, the SCP polymerization reaction may be carried out in a reactor system employing a first and second polymerization reactor which are continuously stirred tank reactors (CSTR). In one embodiment, the first CSTR may be operated in the temperature range of from 110° C. to 135° C. while the second CSTR may be operated in the range of from 135° C. to 165° C.

The SCPs produced as described herein may display enhanced mechanical properties such as a decreased haze, increased impact strength, increased ductility, a broad molecular weight distribution, or combinations thereof.

In an embodiment, an SCP of this disclosure has a reduced haze as compared to an SCP lacking an alkyl acrylate and/or alkyl methacrylate. Haze indicates the degree to which a film has reduced clarity or cloudiness. In an embodiment, the films of this disclosure have a haze of from 1% to 15%, alternatively from 2% to 10%, alternatively from 3% to 7% as determined in accordance with ASTM D 1003.

In an embodiment, an SCP of this disclosure has a multimodal molecular weight distribution (MWD). The MWD may be determined by means of a curve obtained by gel permeation chromatography (GPC) and the modality of the polymeric composition may be determined by analysis of the GPC curve (also known as a chromatogram). For example, a unimodal composition may display a single peak in the chromatogram, a bimodal composition may display two distinct peaks or a broadened peak with a shoulder, while a chromatogram having three distinct peaks would be classified as trimodal. In an embodiment, the SCPs of this disclosure have a bimodal MWD. This bimodal MWD may be evident by plotting the MWD for each polymer component, an example of which is given in FIG. 1. In FIG. 1, a plot of molecular weight distribution as a function of polymer components for an SCP lacking an alkyl acrylate or alkyl methacrylate, the solid line of Curve A, may display one peak, 10 that is fairly symmetrical about the peak maxima. However, a plot of molecular weight distribution as a function of polymer components for an SCP of this disclosure, the dashed line of Curve B, may display two peaks, 20 and 30 that are not baseline separated suggesting a bimodal MWD comprising both higher and lower molecular weight components.

The SCPs of this disclosure may further be characterized by a higher z-average molecular weight ($M_z$) as compared to an SCP lacking an alkyl acrylate and/or alkyl methacrylate. Specifically, for a polymeric composition the number-average molecular weight $M_n$ is given by equation 1:

$$M_n = \Sigma N_x M_x \quad (1)$$

where $N_x$ is the mole-fraction (or the number-fraction) of molecules whose weight is $M_x$. $M_n$ is related to polymer properties such as brittleness and flow. The weight-average molecular weight $M_w$ is given by equation 2:

$$M_w = \Sigma w_x M_x \quad (2)$$

where $w_x$ is the weight-fraction of molecules whose weight is $M_x$. The $M_w$ is related to polymer strength properties such as tensile strength and impact resistance. In addition to the different average molecular weights of a polymer sample, it is frequently desirable and necessary to know the exact polydispersity (PDI). The PDI is given by equation 3:

$$PDI = M_w/M_n \quad (3)$$

and is further indicative of the modality of the molecular weight distribution. In an embodiment, the SCPs of this disclosure have a PDI of greater than about 2, alternatively greater than about 3, alternatively greater than about 4, alternatively greater than about 5, alternatively greater than about 6, alternatively greater than about 7, alternatively greater than about 8.

The z-average molecular weight ($M_z$) is given by equation 4:

$$M_z = \Sigma w_x M_x^2 / \Sigma w_x M_x \quad (4)$$

where $w_x$ is the weight-fraction of molecules whose weight is $M_x$. $M_z$ is related to polymer ductile properties such as elongation and flexibility. In an embodiment, the SCPs of this disclosure have an $M_z$ of greater than about 600,000 alternatively greater than about 1,500,000, alternatively greater than about 3,000,000.

In an embodiment, the SCPs of this disclosure have a reduced $T_g$ when compared with an otherwise identical SCP lacking an alkyl acrylate and/or alkyl methacrylate. The level of reduction of the $T_g$ may depend on the amount of comonomer added. The $T_g$ is the temperature at which a material's characteristics change from glasslike to rubberlike. The transition is characteristically gradual and the polymer composition becomes less brittle and more ductile. In an embodiment, the addition of a comonomer of this disclosure to a polymer of styrene results in an SCP with a $T_g$ from about 65° C. to about 110° C. as determined in accordance with ASTM E1356-03 Standard Test Method for Assignment of the Glass Transition Temperatures by Differential Scanning Calorimetry In an embodiment, the SCPs of this disclosure have an increased die swell when compared with an otherwise identical SCP lacking an alkyl acrylate and/or alkyl methacrylate. Die swell refers to the expansion of the diameter of a viscoelastic fluid upon extrusion from a pipe. Specifically, die swell is related to the viscoelastic nature of materials and can influence the flow of materials through dies and into molds. All styrenic and polyolefin polymers are viscoelastic. When they are forced through a die, they swell due to what is termed a memory effect. Without wishing to be limited by theory, the die swell may be a consequence of the random coils in the polymer being forced to align as they go through an orifice, however, as soon as they exit the orifice, they retain some molecular "memory" of their original conformation and thus they "spring back" towards the original random coil conformation. The higher the molecular weight (Mz) of the polymer the greater the number of entanglements and the greater the memory effect; thus, the higher die swell. In an embodiment, the SCPs of this disclosure have a die swell of 1.5 to 4, alternatively of 1.5 to 3, alternatively of 1.5 to 2.5 when compared to the die swell observed with a styrene homopolymer having a melt flow index of from 2 g/0 min. to 5 g/10 min.

Without wishing the be limited by theory, the addition of an alkyl acrylate and/or alkyl methacrylate such as those described herein to a polymer of styrene may result in a SCP having the enhanced optical and mechanical properties described due to an alteration in the deformation mechanism of the material. Such mechanistic alterations have been described in detail in an article by Weidisch et al entitled "Transition from Crazing to Shear Deformation in Star Block Copolymers" published in 2002 in Macromolecules Volume 35 pages 6585-6591 and in an article by Stergiou et al entitled "Radical copolymerization of styrene and alkyl methacrylates: monomer reactivity ratios and thermal properties" published in 2002 in European Polymer Journal Volume 38 pages 1963-1970 each of which is incorporated herein by reference in its entirety.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

Copoloymers of styrene with either an O/DA or an IDMA were synthesized. The reaction mixture formulations are presented in Table 3. LUPEROX 531 M80 (300 PPM) and LUPEROX 233 (75 PPPM) were used as initiators. LUPEROX 531 M80 is 1,1-D-(t-amy(peroxy)-cyclohexane and LUPEROX 233 is ethyl 3,3-d(t-butylperoxy)butyrate both of which are commercially available from Arkema. The reactions were carried out in stirred, 500 ml reaction kettles typically using 200 gram batches. The kettle was submerged in an oil bath, which was set at the desired temperature and a sting rate of 100-150 RPMS. The following temperature profile was used: 2 hrs at 110° C., 1 hr at 130° C., and 1 hr at 150° C.

TABLE 3

| Sample Id | Wt % Styrene | Wt % butyl Acrylate Ba | Wt % SR484 Mixed O/DA | Wt % Butyl methacrylate BMA | Wt % SR242 IDMA | DSC Tg Onset Degrees C. | DSC Tg Inflection Degrees C. | Haze Values 30 mil Compression Molded plaques |
|---|---|---|---|---|---|---|---|---|
| 01 | 100 | 0 | 0 | 0 | 0 | 106.71 | 110.91 | 5.1 |
| 02 | 95 | 5 | | | | 94.54 | 98.58 | |
| 03 | 90 | 10 | | | | 87.88 | 91.69 | 2.0 |
| 04 | 85 | 15 | | | | 79.29 | 82.17 | |
| 05 | 80 | 20 | | | | 71.94 | 74.61 | 3.6 |
| 06 | 95 | | 5 | | | 92.71 | 96.71 | |
| 07 | 90 | | 10 | | | 79.16 | 83.71 | 7.2 |
| 08 | 85 | | 15 | | | undetectable | | |
| 09 | 80 | | 20 | | | 104.99 | 109.65 | 20.8 |
| 10 | 90 | 5 | 5 | | | 83.94 | 88.64 | |
| 11 | 80 | 10 | 10 | | | undetectable | | |
| 12 | 95 | | | 5 | | 96.65 | 100.04 | |
| 13 | 90 | | | 10 | | 92.88 | 97.56 | 4.5 |
| 14 | 85 | | | 15 | | 89.26 | 93.64 | |
| 15 | 80 | | | 20 | | 83.68 | 85.5 | 4.4 |
| 16 | 95 | | | | 5 | 96.96 | 101.91 | |
| 17 | 90 | | | | 10 | 87.24 | 91.7 | 6.5 |
| 18 | 85 | | | | 15 | 78.02 | 82.48 | |
| 19 | 80 | | | | 20 | 73.53 | 74.54 | 3.3 |
| 20 | 95 | | | 5 | 5 | 91.21 | 94.62 | |
| 21 | 90 | | | 10 | 10 | 79.63 | 81.55 | |

Four of the formulations 10, 11, 20 and 21 were mixtures of three monomers to form terpolymers. All of the materials were crystal clear before and after devolatilization. The $T_g$ was measured by differential scanning calorimetry (DSC) in accordance with ASTM E1356-03 Standard Test Method for Assignment of the Glass Transition Temperatures by Differential Scanning Calorimetry TA Instruments Technical Application TA309 and are presented in Table 3.

Haze properties were measured for some of the samples using compression-molded 30 mil plaques in accordance with ASTM D 1003 are also presented in Table 3. The results demonstrate that low levels of O/DA results in a reduced $T_g$ onset temperature and inflection point. A reduction in $T_g$ is observed at all concentrations of IDMA measured with the level of reduction in $T_g$ being directly proportional to the amount of comonomer in the formulation.

Figure 2:
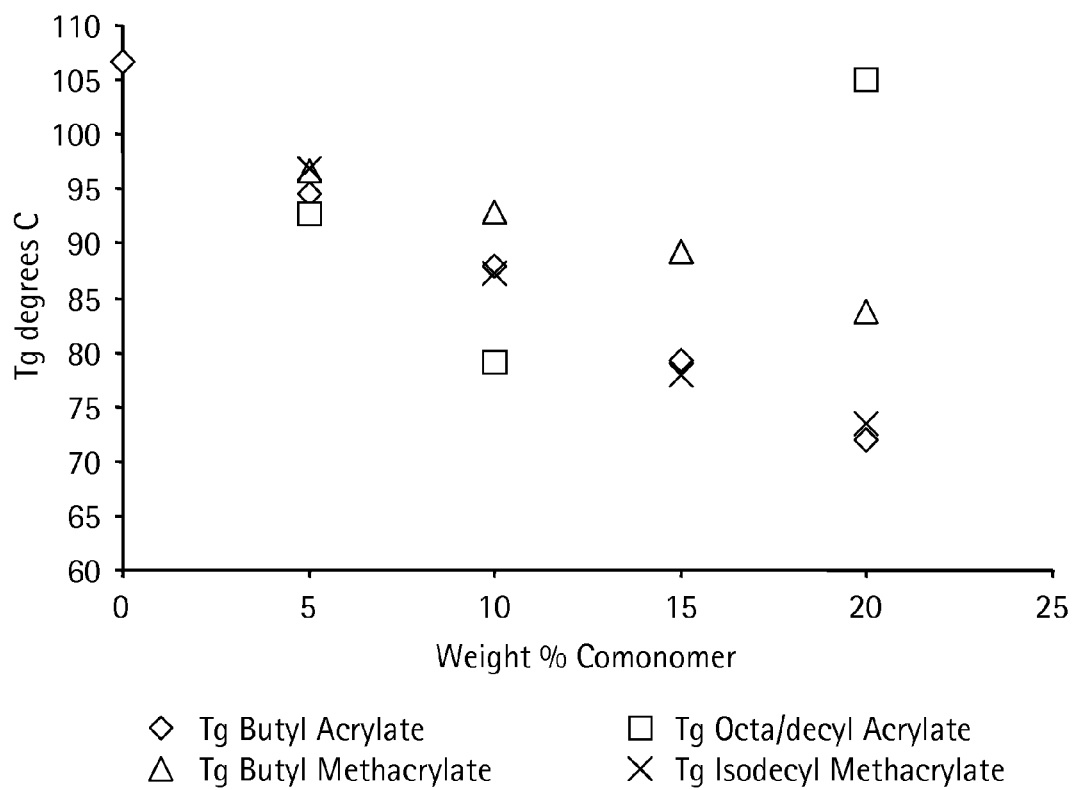
FIG. 2 is a plot of glass transition temperature as a function of weight percent comonomer.

FIG. 2 summarizes the Tg data. With the exception of the data for copolymers with O/DA, a good, linear correlation of Tg with the composition of the comonomer is obtained. The decrease in Tg was expected, as well as, the decrease of Tg by the different monomers. The acrylate comonomers lower the Tg more than the methacrylate comonomers.

Example 2

Figure 5:
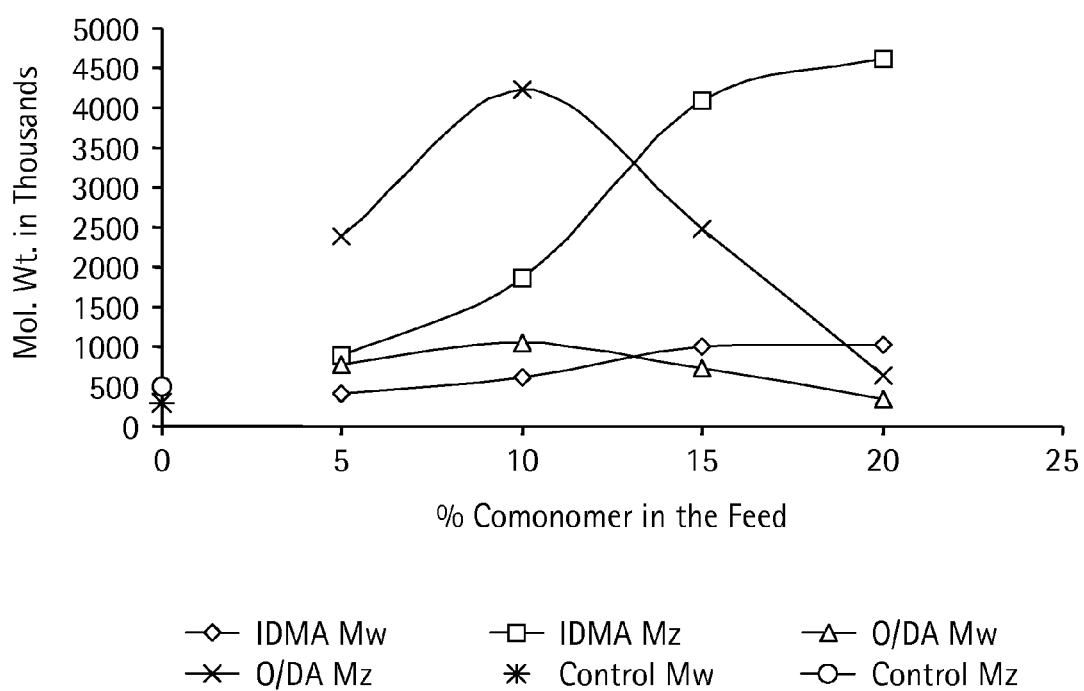
FIG. 5 is a plot of molecular weight as a function of the weight percent comonomer.
Figure 6:
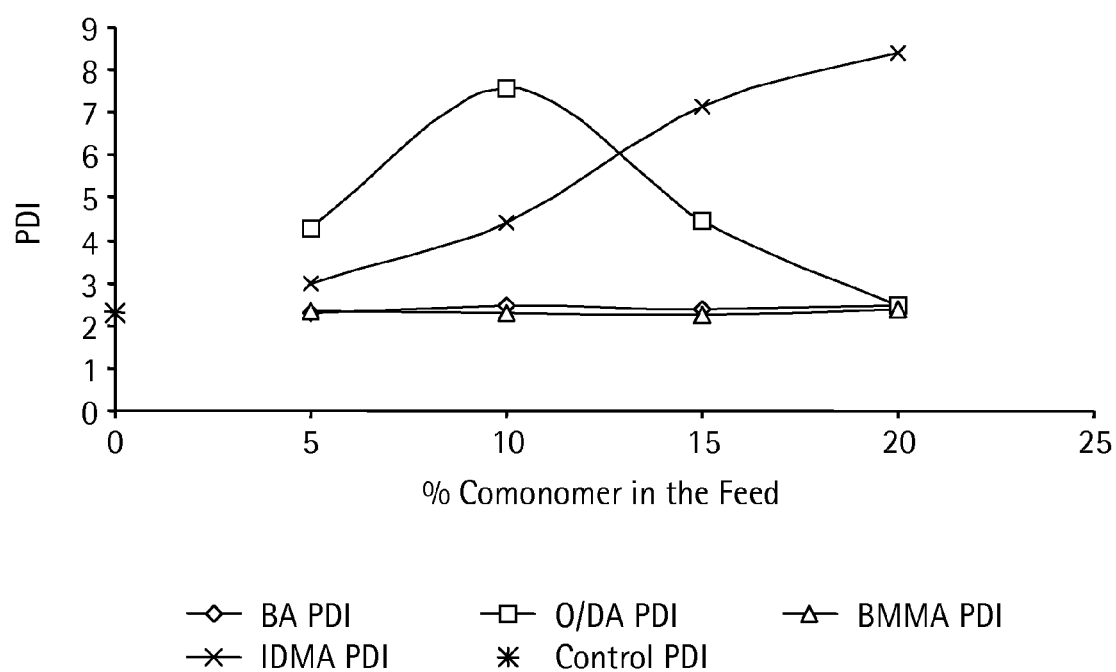
FIG. 6 is a plot of polydispersity as a function of the weight percent comonomer.

The molecular weight distribution of the formulations having O/DA or IDMA were determined by gas permeation chromatography (GPC) and are shown in FIGS. 3 and 4 respectively. FIGS. 3 and 4 show GPC traces of materials with the highest polydispersity indices obtained (PDI). Both SR 484 and SR 242 give GPC traces that show bimodality. In both FIGS. 4 and 5 the top GPC trace shows a major peak eluting at approximately 25.5 minutes with an earlier eluting shoulder at 22.5 minutes. The bimodality could be due to high molecular weight homopolymers produced with the comonomers or an artifact of the composition of the materials. The materials described are clear in appearance and show only one Tg, this indicates the presence of a copolymer and not a mixture of homopolymers. Furthermore, the $M_w$ and $M_z$ for styrene copolymers of O/DA and IDMA are plotted for FIG. 5. FIG. 5 shows the significant difference in $M_w$ and $M_z$ as a function of composition for the copolymers of S—O/DA and S-IDMA. The molecular weights given by traditional GPC are very high. FIG. 6 shows significant changes for the polydispersity indices for the copolymers of S-O/DA and S-DMA.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A styrene copolymer composition comprising at least one alkyl acrylate and/or at least one alkyl methacrylate wherein the styrene copolymer composition has a bimodal molecular weight distribution and a z-average molecular weight that is greater than 1,500,000 daltons.

2. The composition of claim 1 wherein the alkyl acrylate comprises an alkyl group having from 8 to 12 carbon atoms.

3. The composition of claim 1 wherein the alkyl methacrylate comprises an alkyl group having equal to or greater than 10 carbon atoms.

4. The composition of claim 1 wherein the alkyl acrylate is present in an amount from 0.1 wt % to 25 wt % based on total weight of the composition.

5. The composition of claim 1 wherein the alkyl acrylate is octyl acrylate, nonyl acrylate, decyl acrylate, undecyl acrylate, docdecyl acrylate, or combinations thereof.

6. The composition of claim 1 wherein the alkyl methacrylate is isodcecyl methacrylate, undecyl methacrylate, stearyl methacrylate or combinations thereof.

7. The composition of claim 1 wherein the alkyl acrylate is an octyl/decyl acrylate mixture.

8. The composition of claim 1 wherein the alkyl methacrylate is isodecyl methacrylate.

9. The composition of claim 1 wherein the alkyl methacrylate is present in an amount from 0.1 wt % to 25 wt. % based on total weight of the composition.

10. The composition of claim 1 wherein the glass transition temperature is from 65° C. to 105° C.

11. The composition of claim 1 wherein the die swell is from 1.5 to 4 times that of a styrene homopolymer having a melt flow index of from 2 g/10 min. to 5 g/10 min.

12. The composition of claim 1 wherein the polydispersity index is greater than 3.

13. The composition of claim 1 wherein the haze is from 1% to 3%.

14. A method of increasing the molecular weight distribution in a styrene copolymer comprising incorporating at least one alkyl acrylate and/or at least one alkyl methacrylate into the styrene copolymer in a continuous production process wherein the styrene copolymer has a polydispersity index equal to or greater than 3.

15. The method of claim 14 wherein the alkyl acrylate comprises an alkyl group having from 8 to 12 carbon atoms.

16. The method of claim 14 wherein the alkyl methacrylate comprises an alkyl group having equal to or greater than 10 carbon atoms.

* * * * *